United States Patent
Lelli et al.

(10) Patent No.: US 6,656,981 B2
(45) Date of Patent: Dec. 2, 2003

(54) METHOD FOR REDUCING DUST DEPOSITION ON POLYOLEFIN FILMS

(75) Inventors: Nicola Lelli, Basel (CH); Nadi Ergenc, Therwil (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/939,903

(22) Filed: Aug. 27, 2001

(65) Prior Publication Data

US 2002/0043178 A1 Apr. 18, 2002

(30) Foreign Application Priority Data

Aug. 29, 2000 (EP) .............................................. 00810777

(51) Int. Cl.⁷ ............................................... C08L 67/02
(52) U.S. Cl. ....................................... 523/135; 525/165
(58) Field of Search ........................... 523/135; 525/165

(56) References Cited

U.S. PATENT DOCUMENTS

| | | | | |
|---|---|---|---|---|
| 5,348,804 A | * | 9/1994 | Vasselin | 428/423.1 |
| 5,886,098 A | * | 3/1999 | Ueda | 525/66 |
| 5,965,206 A | | 10/1999 | Hilti et al. | 427/393.1 |

FOREIGN PATENT DOCUMENTS

| | | |
|---|---|---|
| EP | 0303489 | 2/1989 |
| EP | 0476895 | 3/1992 |

* cited by examiner

*Primary Examiner*—Edward J. Cain
(74) *Attorney, Agent, or Firm*—Tyler A. Stevenson

(57) ABSTRACT

The present invention provides a method for reducing dust deposits on polyolefin films. Further subjects of the invention are the use of a polyetheresteramide for reducing dust deposits on polyolefin films and coextruded multilayer polyolefin films containing a polyetheresteramide at least in one outer layer.

7 Claims, No Drawings

METHOD FOR REDUCING DUST DEPOSITION ON POLYOLEFIN FILMS

The present invention provides a method for reducing dust deposits on polyolefin films by incorporating therein a polyetherester amide or a composition containing a polyetherester amide. Further subjects of the invention are the use of a polyetherester amide based composition for reducing dust deposits on polyolefin films and coextruded multilayer polyolefin films containing a polyetherester amide at least in one outer layer.

Dust deposition on plastic foils is not only an esthetic but also a hygienic and safety problem. In packaging and subsequent storage of food, germs can be deposited together with the dust and may cause severe diseases. This must also be avoided in medical and pharmaceutical packaging.

In packaging of electronic parts, dust may cause malfunctions and consequently considerable damages may occur during use.

One of the major problems in agricultural applications such as in greenhouses, made from transparent polyolefin films, is dust deposition on the interior or exterior side of the film which sticks to the film and cannot easily be removed by simple rinsing with water. Already small amounts of dust reduce the light transmission of the film significantly which results in less plant growth. The effect of dust deposition on the light transmission of greenhouse foils is for example described by A. Jaffrin et al. in Plasticulture, No.101, 1994, page 33–44.

Several attempts have been made to reduce dust deposition on polyolefin films for packaging and particularly for agricultural applications, such as greenhous, mulch, silage or bale wrap. Typical antistatic agents such as alkylamine ethoxylates, polyethyleneglycol sorbitan monooleate or sorbitan stearate have been used with limited success.

It has now been found that dust deposition can be significantly reduced by incorporating polyetherester amides or compositions containing polyetherester amides into the films. The films remain essentially transparent. A further advantage is, that even if small amounts of dust are deposited, it can be easily washed away, since the dust particles adhere only loosely to the polymer film.

Alongside with dust deposition the formation of algae is observed on polyolefin films used in greenhouses. This is highly undesirable since it further decreases transmitted light and in addition can lead to plant diseases.

One subject of the present invention is a method for reducing dust deposition on polyolefin films, comprising, incorporating into the polyolefin film a polyetherester amide or a composition containing a polyetherester amide.

Examples for polyolefins from which films can be made are given below.

1. Polymers of monoolefins and diolefins, for example polypropylene, polyisobutylene, poly but-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferably the polyolefin is polyethylene (PE), a L- or LL-DPE, a L- or LL-DPE/ethylene-vinyl acetate copolymer (EVA) or a L-or LL-DPE/ethylene-butylacrylate copolymer (EBA).

The polyolefin film has typically a thickness from 10 to 300 micron, preferably 20–250 micron, most preferably 25–220 micron.

The polyolefin film may be of a single layer or be a multilayer construction, which has been manufactured by co-extrusion with up to 20 layers, preferably up to 7 layers, most preferably up to 5 layers.

A preferred embodiment of the present invention is a coextruded film with three to five layers wherein at least one outer layer contains a polyetherester amide or a composition containing a polyetherester amide.

More preferably only one outer layer contains a polyetherester amide or a composition containing a polyetherester amide.

The polyolefin films are particularly useful for agricultural applications (greenhouse, mulch, bale wrap, silage films), food packaging, electronic parts packaging, pharmaceutical packaging, hygienic films and medical equipment packaging.

When used in agricultural applications the films are preferably used for greenhouses. The films can form the cover of a greenhouse, protecting the plants from the influences of the surrounding or the films can be used in the inside of a greenhouse to cover or protect the plants or a part of the plants from influences originating from inside, such as artificial watering or spraying of herbicides and/or insecticides.

Consequently a preferred method is wherein the polyolefin film is used as a cover or protective film in a greenhouse.

The films can be coextruded by film extrusion such as blown film extrusion or by cast film extrusion or they can be laminated and they can include layers based on polymers such as polyamide (PA 6 or 6,6 or 11 or 12 or 6/6,6 copolymer including OPA), polyethylene terephtalate (PET including OPET), polyethylene naphtalate (PEN), ethylene vinyl alcohol (EvOH), polypropylene (including OPP), ethylene acrylic acid copolymers and their salts, ethylene methacrylic acid copolymers and their salts, or Polyvinylidenchloride (PVDC) or aluminum foil. The films can also be coated with the above polymers or silicone-based coatings (e.g. SiOx) or aluminum oxide or any other coating applied by plasma, web coating or electron-beam coating. The same films can also be used for paper or paperboard coating by extrusion coating.

The polyetherester amide is a block copolymer. A block copolymer is especially a polyether ester amide in which the polyether segments consist of polyethylene glycol units having a molecular weight $M_n$ of from 200 to 6000 daltons and the polyamide segments consist of polyamide (x) or polyamide (x,y) having a molecular weight $M_n$ of from 200 to 6000 daltons, x and y being a number from 4 to 14.

Suitable polyetherester amides are described, for example, in EP-A-613 919.

Other equally well suited polyetherester amides and their preparation are described in DE-OS-25 23 991.

Particularly preferred is a composition containing a polyetherester amide. Such compositions are principally known and for example described in U.S. Pat. No. 5,965,206.

These compositions comprise a fibre-forming or fibrous organic polymeric material, such as a polyamide fibre, together with the polyetherester amide, which can be so incorporated into the polyolefin film that the polyetherester amide is substantially adsorptively bound to the fibre or dissolved in it and together with it forms a network in the polyolefin film in which the fibre is not soluble. A portion of the polyetherester amide has polar groups that are capable of complexing or solvating a salt of an inorganic or organic protonic acid.

The fibrous or fibre-forming organic polymeric material must be so selected that it does not dissolve in the thermoplastic or elastomeric substrate but is able to form a net-like structure of contiguous fibres. Polyamide fibres are most useful in this respect.

Typical examples for a suitable polyamide are:

Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylene-diamine and isophthalic or/and terephthalic acid and with or without an elastomer as modifier, for example poly-2,4,4,-trimethylhexamethylene terephthalamide or poly-m-phenylene isophthalamide.

If material that is already fibrous is used, then the material may be selected in various fibre thicknesses. Fibre thicknesses are usually quoted in dtex (g/10000 m). Fibre thicknesses of from 0.5 to 500 dtex are typical, with the use of fibre thicknesses of from 1 to 100 dtex being preferred.

Especially preferred are the following salts $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$ and $Ca(CF_3SO_3)_2$.

Since the polyamide fibres and the polyetherester amide are high-molecular-weight compounds, there is also virtually no risk of their being exuded, with the result that their activity is especially durable.

The stability properties of the polymer, such as thermostability and resistance to light and hydrolysis, are in most cases virtually unaffected.

A most useful composition comprises
a) 20–80 parts of a fibrous polyamide
b) 80–20 parts of a polyetherester amide and
c) 1–5 parts of $NaClO_4$.

The sum of components a), b) and c) being 100 parts.

Preferably the polyamide is polyamide 6 or polyamide 12.

Such compositions are commercially available and for example sold by Ciba Sepcialty Chemicals under the trade name Irgastat P®.

The polyetherester amide or the composition containing the polyetherester amide is preferably added in an amount of from 0.5 to 100%, more preferably from 2 to 20% and most preferably from 5 to 15% by weight, based on the polyolefin film. When coextruded films are used the amount is based on the weight of the film in which it is incorporated.

The polyolefin films may contain additional additives, which may be already present in the film or which may be added together with the polyetherester amide mixture. Typical further additives are:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethyl-phenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example a-tocopherol, b-tocopherol, g-tocopherol, d-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis (2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis (3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of b-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of b-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of b-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of b-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p- phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyidiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(a,a-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-($\alpha$,$\alpha$-dimethylbenzyl)-5'-(1,1,3,3-tetramethylbutyl)phenyl]-benzotriazole; 2-[2'-hydroxy-3'-(1,1,3,3-tetramethylbutyl)-5'-($\alpha$,$\alpha$-dimethylbenzyl)phenyl]benzotriazole.

2.2.2-Hydroxvbenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl $\alpha$-cyano-$\beta$,$\beta$-diphenylacrylate, isooctyl $\alpha$-cyano-$\beta$,$\beta$-diphenylacrylate, methyl $\alpha$-carbomethoxycinnamate, methyl $\alpha$-cyano-$\beta$-methyl-p-methoxycinnamate, butyl $\alpha$-cyano-$\beta$-methyl-p-methoxycinnamate, methyl $\alpha$-carbomethoxy-p-methoxycinnamate and N-(b-carbomethoxy-b-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetra-methyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N, N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-a-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos®168, Ciba-Geigy), tris(nonylphenyl) phosphite, (A)

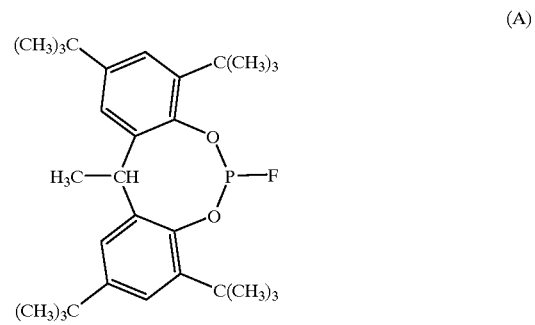

(B)

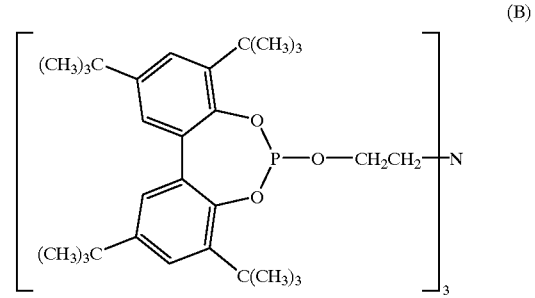

(C)

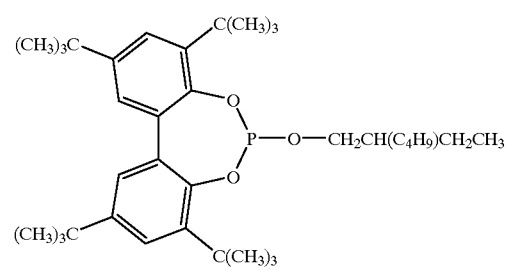

(D)

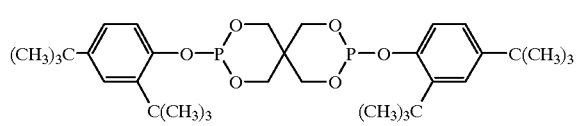

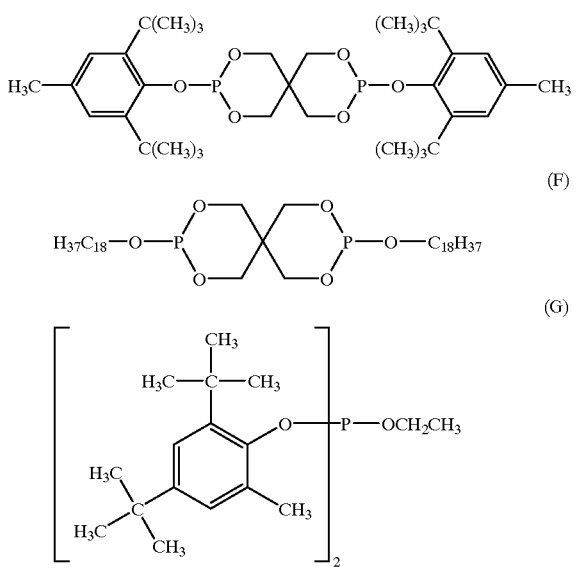

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of b-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(b-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers, thermal fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents, oxygen scavengers, thermal fillers and blowing agents.

14. Benzofuranones and indolinones, for example those disclosed in U.S. Pat. No. 4,325,863; No. 4,338,244; No. 5,175,312; No. 5,216,052; No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

Consequently a preferable method is wherein the polyolefin film additionally contains a UV absorber and/or a light stabilizer selected from the class of sterically hindered amines. Examples for UV-absorbers and sterically hindered amines are given above.

Particularly preferred sterically hindered amines are those prepared in U.S. Pat. No. 6,117,995.

If an additional antistatic agent is added it is preferably a Li-trifluoromethane sulfinimide salt as described in U.S. Pat. No. 6,140,405.

The production of the polyolefin film may be carried out in a manner known per se by mixing the said components and, if desired, further additives with the polymer using devices known per se, such as calenders, mixers, kneaders, extruders and the like. The additives may be added individually or in admixture with one another. It is also possible to use so-called master batches.

A polyolefin film according to the present invention can be made into the desired form in known manner. Such processes include, for example blown extrusion or cast extrusion.

A further subject of the invention is the use of a polyetherester amide or a composition containing a polyetherester amide for reducing dust deposition on polyolefin films.

More preferred is the use of a poyletherester amide composition, which composition comprises
a) 20–80 parts of a fibrous polyamide
b) 80–20 parts of a polyetherester amide and
c) 1–5 parts of $NaClO_4$; wherein the sum of components a), b) and c) being 100 parts, for reducing dust deposition on polyolefin films.

Particularly preferred is the use of a polyetherester amide or a composition containing a polyetherester amide for reducing dust deposition on polyolefin films for greenhouses and packaging.

Particularly preferred is the use of a polyetherester amide or a composition containing a polyetherester amide for reducing dust deposition on transparent polyolefin films for greenhouses.

Most preferred is the use of a polyetherester amide or a composition containing a polyetherester amide wherein the polyolefin film is a three layer coextruded film and the polyetherester amide or the composition containing a polyetherester amide is at least in one outer layer.

The invention is illustrated by the following examples.

Film composition: Three layer coextruded film containing the additive in the outer layer
Composition #1:
Outer layer (50 μm): LDPE (Riblene FF29)
Middle layer (100 μm): EVA (VA 14%—Greenflex FF45)
Inner layer (50 μm): EVA (VA 5%—Greenflex FD20)
Composition #2:
Outer layer (50 μm): EVA (VA 5%—Greenflex FD20)
Middle layer (100 μm): EVA (VA 14%—Greenflex FF45)
Inner layer (50 μm): EVA (VA 5%—Greenflex FD20)

TABLE 1

Formulations

| Sample | Film composition | AS (in outer layer) | LS (in all layers) |
|---|---|---|---|
| 1 | 1 | none | 0.7% Tinuvin 492 |
| 2 | 1 | 15% Irgastat P18 | 0.7% Tinuvin 492 |
| 3 | 1 | none | 0.7% compound A |
| 4 | 1 | 15% Irgastat P18 | 0.7% compound A |
| 5 | 1 | 15% Pebax MV 1074 | 0.7% Tinuvin 492 |
| 6 | 1 | 15% Pebax MV 1074 | 0.7% compound A |
| 7 | 2 | none | 0.7% Tinuvin 492 |
| 8 | 2 | 15% Irgastat P18 | 0.7% Tinuvin 492 |
| 9 | 2 | none | 0.7% compound A |
| 10 | 2 | 15% Irgastat P18 | 0.7% compound A |
| 11 | 2 | 15% Pebax MV 1074 | 0.7% Tinuvin 492 |
| 12 | 2 | 15% Pebax MV 1074 | 0.7% compound A |

Experimental procedure

The samples are obtained by cutting from the film a piece of circular shape having a diameter of about 10 cm. The specimen is then placed, with the layer in case containing the additive up, into a metal container made like a Petri dish with a round hole in the middle that fits the size of the circular sample. A round Teflon block of the same diameter is put on the sample; the block has a hole in the middle of truncated cone section, so that the hole is larger on the top side and smaller on the bottom side, which is of about 4 cm diameter, the size entrance of the integrating sphere of the hazemeter. On the bottom side of the Teflon block there is a O-ring having a slightly smaller diameter than the hole in the metal part. The O-ring ensures good adhesion between the film and the block and prevents the powder from spreading out of the circular area delimited by the ring itself. The film is marked along the circumference of contact between the Teflon block and the sample.

A weighted amount of powder (2.5 grams) is loaded on the system made of the metal part, the Teflon block and the film in between, with the help of a truncated cone glass junction, having a flat bottom part that is leaned on the upper side of the Teflon block. After removing the glass junction, the system is closed by fitting on the upper part a second metal piece, made like the former, but with no hole. In order to create a uniform layer of powder on the film, the whole block is shaken keeping it horizontal for a definite time. Then the system is quickly turned upside-down, leaned on a semi-soft surface and hit on the top in a definite manner. The sample is taken away and can be manipulated using the circular area between the external border and the marked circumference.

Haze is measured first, before the treatment with the powder by a Labsphere hazemeter model HMZ 1200 L. After the treatment, haze is measured again, then the specimen is cut along the marked circumference and weighted ('gross 'weight). In order to obtain the 'net 'weight, the sample is dipped into water and accurately dried before being weighted again. Four specimens per formulation have been evaluated.

TABLE 2

Results
Average (and std. deviation) of 4 measurements

| Sample | 'Gross' wt. (mg) | 'Net' wt. (mg) | Δwt. (mg) | Haze % before treat. | Haze % after treat. | Incr. % haze |
|---|---|---|---|---|---|---|
| 1 | 352.98 ± 12.35 | 334.21 ± 13.46 | 18.77 | 20.8 ± 0.6 | 69.1 ± 1.4 | 233 |
| 2 | 352.21 ± 18.18 | 339.04 ± 18.97 | 13.17 | 25.5 ± 2.6 | 56.9 ± 4.6 | 123 |
| 5 | 355.80 ± 13.0 | 341.03 ± 14.4 | 14.77 | 47.5 ± 2.9 | 68.7 ± 2.4 | 45 |
| 3 | 366.10 ± 20.02 | 351.54 ± 20.17 | 14.56 | 9.3 ± 0.3 | 53.8 ± 1.3 | 478 |
| 4 | 349.56 ± 9.41 | 342.84 ± 7.61 | 6.72 | 14.2 ± 1.1 | 34.0 ± 4.6 | 139 |
| 6 | 371.47 ± 8.80 | 361.13 ± 7.56 | 10.32 | 27.0 ± 4.4 | 48.1 ± 4.5 | 78 |
| 7 | 370.17 ± 9.51 | 351.47 ± 8.21 | 18.70 | 18.7 ± 0.2 | 69.0 ± 2.2 | 269 |
| 8 | 332.66 ± 5.00 | 321.57 ± 5.17 | 11.09 | 24.5 ± 1.6 | 51.8 ± 3.3 | 111 |
| 11 | 378.32 ± 15.08 | 362.15 ± 14.65 | 16.17 | 35.7 ± 2.4 | 63.6 ± 1.6 | 78 |
| 9 | 376.25 ± 3.59 | 361.27 ± 3.58 | 14.98 | 7.3 ± 0.2 | 53.8 ± 1.4 | 637 |
| 10 | 345.28 ± 8.16 | 336.97 ± 7.98 | 8.31 | 12.9 ± 1.2 | 37.1 ± 2.8 | 188 |
| 12 | 373.49 ± 19.32 | 360.41 ± 5.04 | 13.08 | 14.1 ± 1.3 | 44.5 ± 1.7 | 216 |

Powder in the experiment
Corindon ($Al_2O_3$ 99.7%)
Granulometry: 93.3%<200 μm
Additives used:
Irgastat P18® (composition containing a polyetherester amide, commercial product of Ciba Speciality Chemicals)
Pebax MV 1074® polyetherester amide, commercial product of Elf Atochem (today Atofina)
Tinuvin® 492 (sterically hindered amine light stabilizer, commercial product of Ciba Specialty Chemicals)
Compound A is the compound prepared in example 2 of U.S. Pat. No. 6,117,995.

From the results in table 2 it is clear that the samples which contain Irgastat P18 or Pebax MV1074 take considerably less dust up and show a much lower increase in haze than the reference samples (no. 1, 3, 7 and 9)

What is claimed is:

1. A method for reducing dust deposition on polyolefin films, comprising incorporating into the polyolefin film a polyetherester amide or a composition containing a polyetherester amide,
   wherein the polyolefin film is a coextruded film with three to 5 layers wherein at least one outer layer contains a polyetherester amide or a composition containing a polyetherester amide.

2. A method according to claim 1, wherein the polyolefin is polyethylene (PE), a L- or LL-DPE, a L- or LL-DPE/ethylene-vinyl acetate copolymer (EVA) or a L-or LL-DPE/ethylene-butylacrylate copolymer (EBA).

3. A method according to claim 1, wherein the polyolefin film is a coextruded film with three layers wherein at least one outer layer contains a polyetherester amide or a composition containing a polyetherester amide.

4. A method according to claim 1, wherein the poylether-ester amide composition comprises a) 20–80 parts of a fibrous polyamide b) 80–20 parts of a polyetherester amide and c) 1–5 parts of NaClO$_4$; wherein the sum of components a), b) and c) being 100 parts.

5. A method according to claim 1, wherein the polyetherester amide or the composition containing the polyetherester amide is added in an amount of from 0.5 to 100% by weight, based on the polyolefin film.

6. A method according to claim 1, wherein the polyolefin film is used as a cover or protective film in a greenhouse.

7. A method according to claim 1, wherein the polyolefin film additionally contains a UV absorber and/or a light stabilizer selected from the class of sterically hindered amines.

* * * * *